3,206,476
3-SUBSTITUTED-4-HYDROXY-6-ARYL-2-PYRONES AND PREPARATION
Joseph C. Collins, East Greenbush, N.Y., assignor to Sterling Drug Inc., New York, N.Y., a corporation of Delaware
No Drawing. Filed June 4, 1962, Ser. No. 199,645
10 Claims. (Cl. 260—343.5)

This invention relates to new heterocyclic compounds and in particular is concerned with 3,6-disubstituted-4-hydroxy-2H-pyran-2-ones. The invention also relates to methods for preparing the compounds and to novel intermediates used in their preparation.

The substituted-4-hydroxy-2H-pyran-2-ones, also called substituted-4-hydroxy-2-pyrones, have the general formula

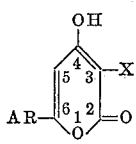

Formula I wherein X is a member selected from the group consisting of halo, amino, and alkanoylamino radicals, and AR is a monocarbocyclic aryl radical.

In Formula I, when representing halo, X is a chlorine, bromine or iodine radical. The 3-halo-4-hydroxy-6-AR-2-pyrones are conveniently prepared by reacting a compound of the formula

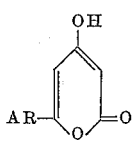

Formula II wherein AR is a monocarbocyclic aryl radical, with a halogenating agent effective for causing halogen substitution at the 3-position of the 2-pyrone ring. Examples of such effective halogenating agents are chlorine, bromine and iodine. Chlorine and bromine react readily at ambient temperatures without a catalyst, but iodination usually requires the presence of an oxidizing or a basic reagent, for example, mercuric oxide, nitric acid or sodium persulfate. We generally prefer to iodinate 4-hydroxy-6-monocarbocyclic aryl-2-pyrones with iodine in the presence of mercuric oxide. Suitable inert solvents for the halogenating reactions include, for example, glacial acetic acid, chloroform, dimethylformamide, and the like.

In Formula I, the compounds wherein X represents amino can be produced by reduction of the corresponding nitro-substituted compounds, which are represented by Formula I wherein X is nitro. Suitable reducing agents are the combination of active metals with relatively strong acids, for example, iron and acetic acid, zinc and acetic acid, tin and hydrochloric acid, and other metal-acid combinations well-known in the art; hydrogen and a suitable catalyst; sodium borohydride in the presence of a palladium-charcoal catalyst; and aluminum amalgam in aqueous alcohol. The reductions can be conducted at ambient temperatures; however, many of the substituted nitro-2-pyrones are difficultly soluble in the usual solvents (e.g., lower aliphatic alcohols, water, acetic acid and the like) and heating is often required to effect solution.

The intermediate 3-nitro-4-hydroxy-6-AR-2-pyrones can be prepared by nitration of compounds of Formula II with fuming nitric acid. The reaction proceeds well at ambient temperatures in inert solvents such as glacial acetic acid.

In Formula I, when representing alkanoylamino, X is AcNH— wherein Ac is a straight- or branched-chain alkanoyl radical containing from one to about ten carbon atoms. Examples of alkanoylamino radicals represented by X are formamido, acetamido, propionamido, butyramido, isobutyramido, caproamido, n-octanamido, n-decanamido, and the like. The alkanoylamino substituted-4-hydroxy-6-AR-2-pyrones can be prepared from the corresponding 3-amino compounds by reacting the latter with alkanoic anhydrides.

In Formula I, AR represents a monocarbocyclic aryl radical. It thus includes phenyl and phenyl substituted by one or more substituents inert under the conditions of the processes used to prepare the compounds. A preferred class of monocarbocyclic aryl radicals includes phenyl and phenyl substituted by from one to three substituents selected from the group consisting of lower alkyl (having from one to about five carbon atoms, for example, methyl, ethyl, n-propyl, isopropyl, butyl, amyl, and the like), nitro, halogen (including fluorine, chlorine, bromine, and iodine), amino, alkanoylamino wherein the alkanoyl group is as defined above, and trifluoromethyl. A particularly preferred group represented by AR is phenyl, owing to the ready availability of the starting material necessary for the preparation of the intermediate, 4-hydroxy-6-phenyl-2-pyrone.

The intermediate 4-hydroxy-6-AR-2-pyrones of Formula II can be prepared by known procedures from lower alkyl aroylacetic esters, for example ethyl benzoylacetate, ethyl p-chlorobenzoylacetate, ethyl p-nitrobenzoylacetate, and the like, by refluxing the ester in the presence of an alkali metal bicarbonate in nitrobenzene, followed by acidic hydrolysis of the resulting 3-aroyl-4-hydroxy-6-aryl-2-pyrone with, for example, aqueous sulfuric acid.

The rather severe reaction conditions of the latter hydrolysis in the preparation of the intermediates and any one of the reactions utilized in the preparation of the final products (halogenation, nitration, reduction and alkanoylation) dictates that substituents on the 6-aryl group shall be chosen with discrimination, as is within the skill of the art. For example, 4-hydroxy-6-(p-nitrophenyl)-2-pyrone can be halogenated or nitrated, but, in the case of nitration, subsequent reduction of the 3-nitro group concomitantly reduces the p-nitrophenyl group to p-aminophenyl, and again, alkanoylation of 3-amino-4-hydroxy-6-(p-aminophenyl)-2-pyrone results in the formation of 3-alkanoylamino-4-hydroxy-6-(p-alkanoylaminophenyl)-2-pyrone. Similarly 4-hydroxy-6-(p-aminophenyl)-2-pyrone can be prepared by reduction of the corresponding p-nitro compound, but subsequent halogenation results in halogenation of the 6-aminophenyl group. Hence the presence of an amino substituent on the 6-aryl group dictates, as will be obvious to the chemist, that the formation of the amino substituent must follow halogenation or nitration reactions in the preparation of the final products.

The compounds of Formula I bear a hydroxyl group in the 4-position, the hydrogen of which is acidic. Consequently the compounds are soluble in aqueous alkali and form salts with strong organic and inorganic bases. These salts are the equivalents of the free acids specifically claimed. Preferred salts are those which are non-toxic and water soluble, for example, the sodium and potassium salts, although other salts, for example, the calcium, silver, lead, and tetramethylammonium salts are useful in purification and characterization of the free acids.

Pharmacological evaluation of the compounds of Formula I has indicated that they possess pharmacodynamic activity. In particular, they possess antihydpertensive activity which indicates their usefulness in the treatment of hypertension.

The structures of the compounds were established by their mode of synthesis and by the fact that the results of chemical analyses were in agreement with the expected structures.

The following examples will further illustrate the invention without the latter being limited thereby.

EXAMPLE 1

*4-hydroxy-3-nitro-6-phenyl-2H-pyran-2-one*

To a suspension of 4.5 g. of 4-hydroxy-6-phenyl-2H-pyran-2-one in 25 ml. of glacial acetic acid was added 2.0 ml. of fuming nitric acid. The resulting thick slurry was stirred for five minutes at about 25°, and then was cooled in an ice-bath and filtered. After recrystallization from glacial acetic acid, the product, 4-hydroxy-3-nitro-6-phenyl-2H-pyran-2-one, consisting of tan plates, melted at 183.2–184.6° C. (corr.).

The following compounds can be prepared according to the above procedure from the corresponding compound unsubstituted in the 3-position:

4 - hydroxy-3-nitro-6-(4-nitrophenyl)-2H-pyran-2-one;
4 - hydroxy-3-nitro-6-(3,4,5-trichlorophenyl)-2H-pyran-2-one;
6 - (4-bromophenyl)-4-hydroxy-3-nitro-2H-pyran-2-one;
6 - (4-iodophenyl)-4-hydroxy-3-nitro-2H-pyran-2-one;
4 - hydroxy-6-(3-methylphenyl)-3-nitro-2H-pyran-2-one; and
4 - hydroxy - 3 - nitro-6-(4-trifluoromethylphenyl)-2H-pyran-2-one.

EXAMPLE 2

*3-amino-4-hydroxy-6-phenyl-2H-pyran-2-one hydrochloride*

To a suspension of 10.0 g. (0.043 mole) of 4-hydroxy-3-nitro-6-phenyl-2H-pyran-2-one in a mixture of 30 ml. of concentrated hydrochloric acid and 60 ml. of glacial acetic acid was added 10 g. of mossy tin. When the mixture was heated to reflux a homogeneous solution resulted. After refluxing for seven minutes, the solution was cooled in an ice bath and diluted with 70 ml. of concentrated hydrochloric acid, whereupon tan needles consisting of 3 - amino-4-hydroxy-6-phenyl-2H-pyran-2-one hydrochloride separated from the solution.

The following compounds can be prepared according to the above procedure by reduction of the corresponding nitro compounds:

3 - amino-6-(4-aminophenyl)-4-hydroxy-2H-pyran-2-one dihydrochloride;
3 - amino-4-hydroxy-6-(3,4,5-trichlorophenyl)-2H-pyran-2-one;
3 - amino-6-(4-bromophenyl)-4-hydroxy-2H-pyran-2-one;
3 - amino-4-hydroxy-6-(4-iodophenyl)-2H-pyran-2-one;
3 - amino - 4 - hydroxy-6-(3-methylphenyl)-2H-pyran-2-one; and
3 - amino-4-hydroxy-6-(4-trifluoromethylphenyl)-2H-pyran-2-one.

EXAMPLE 3

*3-ametamido-4-hydroxy-6-phenyl-2H-pyran-2-one*

To a solution containing 0.04 mole of 3-amino-4-hydroxy-6-phenyl-2H-pyran-2-one hydrochloride in 250 ml. of water was added 12 ml. of acetic anhydride and 30 g. of sodium acetate. The white precipitate of 3-acetamido - 4 - hydroxy-6-phenyl-2H-pyran-2-one thus prepared, following recrystallization from ethanol, melted at 235.6–237.2° C. (corr.).

The following compounds can be prepared according to the above procedure by acylation of the corresponding amino compounds with the appropriate alkanoic anhydride:

4 - hydroxy-3-propionamido-6-(4-propionamidophenyl)-2H-pyran-2-one;
3 - isobutyramido - 4-hydroxy-6-(3,4,5-trichlorophenyl)-2H-pyran-2-one;
6 - (4-bromophenyl)-3-decanoylamino-4-hydroxy-2H-pyran-2-one;
4 - hydroxy-6-(4-iodophenyl)-3-valeramido-2H-pyran-2-one;
3 - caproamido-4-hydroxy-6-(3-methylphenyl)-2H-pyran-2-one; and
3 - formamido - 4-hydroxy-6-(4-trifluoromethylphenyl)-2H-pyran-2-one, which can be prepared using chloral in chloroform in place of acetic anhydride in water in the above procedure.

EXAMPLE 4

*3-bromo-4-hydroxy-6-phenyl-2H-pyran-2-one*

To a solution containing 1.9 g. (0.01 mole) of 4-hydroxy-6-phenyl-2H-pyran-2-one in 15 ml. of dimethylformamide was added 1.6 g. (0.01 mole) of bromine with stirring. The mixture was allowed to stand for five minutes at about 25° and was then diluted with ice-water and filtered. The white crystals of 3-bromo-4-hydroxy-6-phenyl-2H-pyran-2-one thus produced, after recrystallization from glacial acetic acid, melted at 255.4–256.4° C. (corr.).

The following compounds can also be prepared by reaction of the appropriate 4-hydroxy-6-substituted-phenyl-2H-pyran-2-one with the designated halogenating agent:

4 - hydroxy - 3 - iodo-6-(2-nitrophenyl)-2H-pyran-2-one, with iodine and mercuric oxide;
3 - chloro - 4 - hydroxy-6-(4-chlorophenyl)-2H-pyran-2-one, with chlorine;
3 - bromo - 6 - (4-t-butylphenyl)-4-hydroxy-2H-pyran-2-one with bromine; and
3 - chloro - 6 - (4-fluorophenyl)-4-hydroxy-2H-pyran-2-one with chlorine.

I claim:

1. A compound of the formula

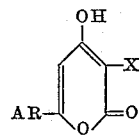

wherein X is a member selected from the group consisting of halogen, amino, and alkanoylamino of from one to ten carbon atoms, and AR is a member of the group consisting of phenyl and phenyl substituted with from one to three substituents selected from the group consisting of lower alkyl, nitro, halogen, amino, alkanoylamino of from one to ten carbon atoms, and trifluoromethyl.

2. A compound of the formula

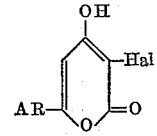

wherein Hal is halogen and AR is a member of the group consisting of phenyl and phenyl substituted with from one to three substituents selected from the group consisting of lower alkyl, nitro, halogen, amino, alkanoylamino of from one to ten carbon atoms, and trifluoromethyl.

3. A compound of the formula

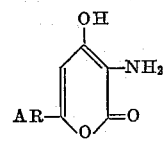

wherein AR is a member of the group consisting of phenyl and phenyl substituted with from one to three substituents selected from the group consisting of lower alkyl, nitro, halogen, amino, alkanoylamino of from one to ten carbon atoms, and trifluoromethyl.

4. A compound of the formula

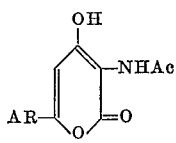

wherein Ac is alkanoyl having from one to ten carbon atoms and AR is a member of the group consisting of phenyl and phenyl substituted with from one to three substituents selected from the group consisting of lower alkyl, nitro, halogen, amino, alkanoylamino of from one to ten carbon atoms, and trifluoromethyl.

5. 3-bromo-4-hydroxy-6-phenyl-2H-pyran-2-one.
6. 3-amino-4-hydroxy-6-phenyl-2H-pyran-2-one.
7. 3-acetamido-4-hydroxy-6-phenyl-2H-pyran-2-one.
8. 4-hydroxy-3-nitro-6-phenyl-2H-pyran-2-one.
9. A compound of the formula

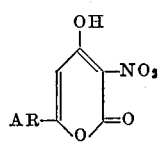

wherein AR is a member of the group consisting of phenyl and phenyl substituted with from one to three substituents selected from the group consisting of lower alkyl, nitro, halogen, amino, alkanoylamino of from one to ten carbon atoms, and trifluoromethyl.

10. The process which comprises nitrating 4-hydroxy-6-monocarbocyclic aryl-2H-pyran-2-one with fuming nitric acid.

References Cited by the Examiner

Cavalieri: Chem. Reviews, vol. 38 (1947), page 577.
Dallacker et al.: Annalen der Chemie, vol. 643 (May 1961), pages 97–109.
Dalvi et al.: J. Indian Chem. Soc., vol. 26 (1949), pages 359 and 364.
Wagner et al.: Synthetic Org. Chem., Wiley, Inc., New York (1953), pages 654–657.

WALTER A. MODANCE, *Primary Examiner*.
IRVING MARCUS, *Examiner*.